United States Patent
Shang et al.

(10) Patent No.: US 11,854,228 B2
(45) Date of Patent: *Dec. 26, 2023

(54) METHODS AND SYSTEMS FOR VOLUMETRIC MODELING INDEPENDENT OF DEPTH DATA

(71) Applicant: Verizon Patent and Licensing Inc., Basking Ridge, NJ (US)

(72) Inventors: Tom Hsi Hao Shang, Forest Hills, NY (US); Elena Dotsenko, Princeton, NJ (US); Liang Luo, Nutley, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,914

(22) Filed: Apr. 5, 2022

(65) Prior Publication Data

US 2022/0230356 A1    Jul. 21, 2022

Related U.S. Application Data

(63) Continuation of application No. 17/073,108, filed on Oct. 16, 2020, now Pat. No. 11,328,445.

(51) Int. Cl.
*G06T 7/73* (2017.01)
*G06T 17/00* (2006.01)
*G06T 7/80* (2017.01)
*H04N 23/90* (2023.01)

(52) U.S. Cl.
CPC .............. *G06T 7/74* (2017.01); *G06T 7/80* (2017.01); *G06T 17/00* (2013.01); *H04N 23/90* (2023.01); *G06T 2200/08* (2013.01); *G06T 2207/20081* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 2019/0188533 A1* | 6/2019 | Katabi | G06V 10/82 |
| 2019/0347826 A1* | 11/2019 | Zhang | G06N 3/08 |
| 2019/0355150 A1* | 11/2019 | Tremblay | G06T 7/73 |
| 2021/0248772 A1 | 8/2021 | Iqbal et al. | |
| 2021/0295559 A1* | 9/2021 | Huang | H04N 23/90 |

\* cited by examiner

*Primary Examiner* — Yanna Wu

(57) ABSTRACT

An illustrative image processing system determines that an object depicted in an image is an instance of an object type for which a machine learning model is available to the image processing system. In response to the determining that the object is the instance of the object type, the image processing system obtains pose data generated based on the machine learning model to represent how objects of the object type are capable of being posed. The image processing system generates a volumetric representation of the object in an estimated pose. The estimated pose is estimated independently of depth data for the object based on the image and the pose data. Corresponding methods and systems are also disclosed.

20 Claims, 9 Drawing Sheets

METHODS AND SYSTEMS FOR VOLUMETRIC MODELING INDEPENDENT OF DEPTH DATA

RELATED APPLICATIONS

This application is a continuation application of U.S. patent application Ser. No. 17/073,108, filed Oct. 16, 2020, and entitled "Methods and Systems for Volumetric Modeling Independent of Depth Data," which is hereby incorporated by reference in its entirety.

BACKGROUND INFORMATION

Various applications and use cases make use of volumetric models of three-dimensional (3D) objects. As one example use case, volumetric models of objects within a scene may be used to generate a representation of the scene and/or the objects for viewers to experience in various ways. For instance, an extended reality system (e.g., a virtual reality system, an augmented reality system, a mixed reality system, etc.) may provide a representation of the scene and/or the objects to be experienced by one or more users by way of extended reality technologies such as virtual reality technology, augmented reality technology, mixed reality technology, or the like. In some examples, such extended reality content may be generated in real time to allow users to experience live events happening at the scene (e.g., live sporting events, live concerts, live news events, live parties, etc.). In other examples, extended reality content may be generated and stored for experiencing in a time-shifted manner.

In other example use cases, volumetrically modeled objects may be useful for generating other types of media content such as video game content, movie special effects, television sports and news effects, and so forth. Additionally, volumetric models of objects may be useful in various other applications including security applications (in which security cameras are configured to locate and/or track humans and objects within a secured space), computer-aided design applications (in which 3D models are scanned for 3D printing or other purposes), computer vision applications (in which information about 3D objects is extracted to implement autonomous processes based on the information), and/or various other entertainment, educational, industrial, commercial, vocational, promotional, and/or other suitable applications and use cases.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
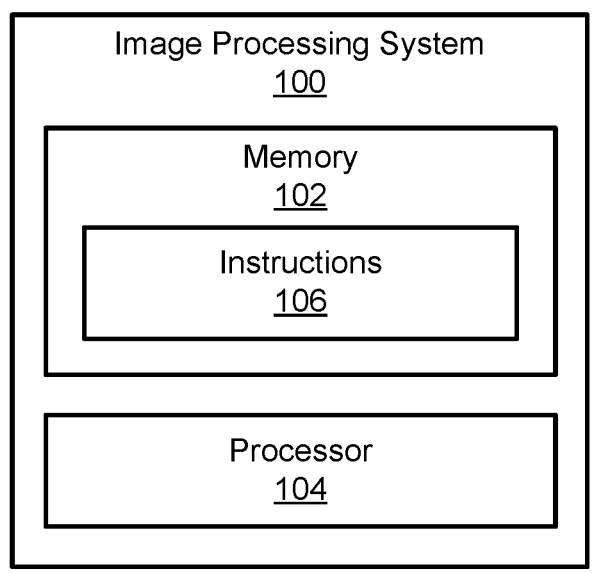
FIG. 1 shows an illustrative image processing system configured to perform volumetric modeling of three-dimensional (3D) objects independent of depth data according to embodiments described herein.

Methods and systems for volumetric modeling independent of depth data are described herein. As described above, volumetric models of objects (e.g., three-dimensional (3D) real-world objects, 3D virtual objects, etc.) may be useful for various applications and use cases. As such, it may be desirable to generate such models in efficient, reliable, and accurate ways.

One way to generate a volumetric model of an object is to combine image data that is captured by a camera with depth data that is captured by a depth capture device (e.g., a device that uses stereoscopic, time-of-flight, structured light, or other depth scanning techniques to capture depth data representative of the object). As used herein, image data may refer to data that represents an object's appearance in terms of color, texture, and so forth. Image data may be captured by a camera such as a still camera or a video camera, and may be represented using any image data format as may serve a particular implementation. In contrast, depth data, as used herein, may refer to data that represents the object's physical location and/or the geometry of the object's surfaces with respect to a 3D coordinate space (e.g., with respect to an origin point within the scene, with respect to the location of a depth capture device, etc.). In some examples, depth data may be captured by a depth capture device (e.g., a depth scanner, etc.) and may include values at each pixel of a depth data representation that represent a distance from a vantage point of the depth capture device to a surface point on the object (e.g., such that closer surface points appear as lighter shades of gray and farther surface points appear as darker shades of gray, or vice versa).

While various advantages may be associated with generating volumetric models based on both image data and depth data, certain challenges may also be associated with this type of modeling. For example, because depth capture devices rely on line of sight to objects whose depth is being captured, depth capture devices are unable to capture depth data for portions of objects that are occluded by other objects, that partially move out of frame, or the like. As such, depth capture devices may not always be capable of reliably capturing sufficient depth data to generate full and complete volumetric models of objects and, as a result, volumetric models generated in this way may be lacking in quality in certain situations.

To address these potential challenges, methods and systems described herein relate to volumetric modeling techniques that may operate independent of depth data. As used herein, modeling techniques operating "independent" of depth data may refer to methods and systems configured to generate volumetric models of objects based on image data and other types of data described herein, and without relying on (or needing to rely on) depth data. For instance, in some implementations, depth data of an object being modeled may not be captured at all, since the image processing system generating the model may be configured to generate the model without any such depth data. These implementations allow greater simplicity of modeling capture setups as depth data capture devices may be omitted from the setup entirely and image data capture devices (e.g., cameras) may be relied on entirely to capture data on which the models will be based. In other implementations, depth data of the object being modeled may be captured and used in the generation of the volumetric model, but the modeling may still be considered "independent" of the depth data because the use of the depth data may be entirely redundant or supplementary to the modeling process (e.g., by serving as a useful but unnecessary "check" on processes performed without using the depth data, etc.). For instance, in these implementations, depth data may be used to increase or decrease the confidence of certain aspects of pose or position estimation described herein.

As will be described in more detail below, volumetric modeling independent of depth data may be achieved by using modeling techniques that simulate a cognitive-like analysis rather than relying on pure data-capture-based analysis. For example, certain objects that are to be volumetrically modeled (e.g., a human body object, a human face object, a known inanimate object such as a particular car or piece of furniture, etc.) may be thoroughly analyzed and modeled by machine learning processes such that a volumetric modeling system may be capable of "understanding" or predicting certain aspects of the object (e.g., what features are expected to be included within the object, how the object is capable of being posed, etc.) even without explicitly capturing image and/or depth data representing these aspects of the objects at all times. For example, based on machine learning data received for a human body object, an image processing system may determine that a foot is expected to be at the end of a leg, even if the foot cannot be captured due to occlusion in the scene. Moreover, based on this machine learning data and a detected pose of the human body object, the image processing system may determine that the foot is likely to be posed in a certain way (e.g., facing forward to support the person's pose) and not in another way (e.g., facing backward in a manner that the human foot is not typically capable of rotating and that would fail to support the person's pose).

Methods and systems described herein for volumetric modeling independent of depth data provide significant benefits and improvements over certain conventional modeling techniques (e.g., modeling techniques relying on depth data, etc.). For example, efficient and streamlined capture setups that omit depth capture devices may simplify setup time, reduce setup effort, improve technical management and support operations for the capture setup (e.g., simplifying troubleshooting of the setup, etc.), and so forth. At the same time, methods and systems described herein may allow for more reliable and complete models to be generated and provided (e.g., filling in gaps that would be left by implementations dependent on depth data, etc.). Even for capture setups that include depth capture devices for redundant or supplemental purposes, depth-data-independent methods and systems may lead to improved volumetric modeling in the sense that volumetric models are not only more reliable and complete (as mentioned above), but also more robust and accurate. For example, this increased robustness and accuracy may arise as a result of methods and systems described herein accounting for well-documented information (e.g., machine learning models, etc.) about how known objects are capable of being posed, even when those objects are difficult to directly analyze based on captured data alone.

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. Methods and systems described herein for volumetric modeling independent of depth data may provide any of the benefits mentioned above, as well as various additional and/or alternative benefits that will be described and/or made apparent below.

FIG. 1 shows an illustrative image processing system 100 configured to perform volumetric modeling of objects independent of depth data according to principles described herein. System 100 may be implemented by computer resources such as server systems or other computing devices that include processors, memory facilities, storage facilities, communication interfaces, and so forth. For example, system 100 may be implemented by computing systems such as local computing systems operated by a user, distributed computing systems operated by a communications provider (e.g., multi-access edge computing (MEC) servers), distributed computing systems operated by a cloud-computing provider (e.g., multi-access cloud servers), or any other suitable computing system or systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with volumetric modeling independent of depth data as described herein and/or as may serve a particular implementation.

Figure 2:
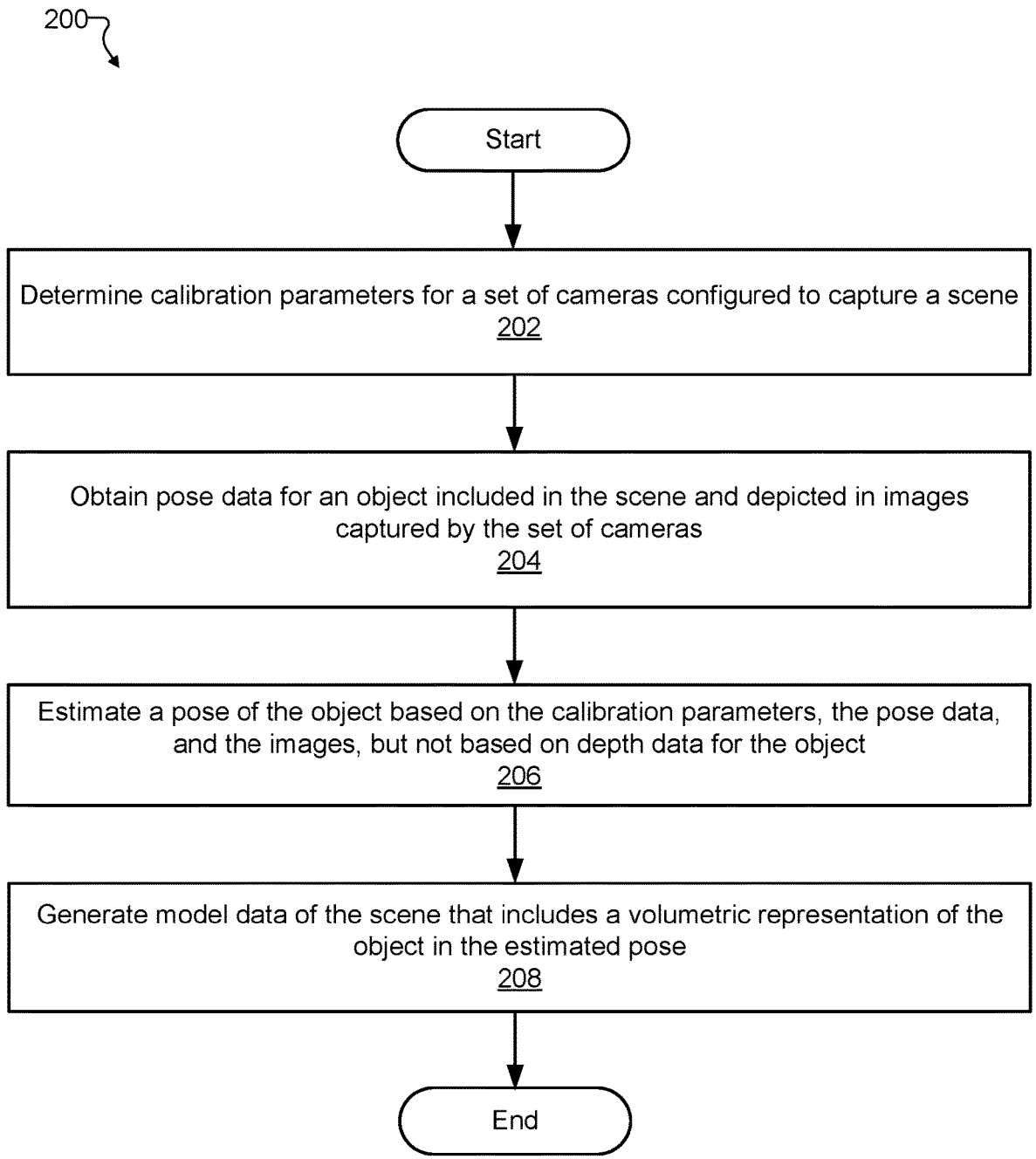
FIG. 2 shows an illustrative method for volumetric modeling independent of depth data according to embodiments described herein.

As one example of functionality that processor 104 may perform, FIG. 2 shows an illustrative method 200 for volumetric modeling independent of depth data in accordance with principles described herein. While FIG. 2 shows illustrative operations according to one embodiment, other embodiments may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by an image processing system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-208 of method 200 will now be described in more detail as the operations may be performed by system 100 (e.g., by processor 104 as processor 104 executes instructions 106 stored in memory 102).

At operation 202, system 100 may determine calibration parameters for a set of cameras. The set of cameras may include various cameras arranged in various positions around a scene (e.g., a real-world or virtual scene that is to be captured and reproduced for any of the applications or use cases described herein) so as to have different vantage points or viewpoints with respect to one or more objects (e.g., 3D real-world objects, 3D virtual objects, etc.) present at the scene. For example, the set of cameras may include at least a first camera configured to capture the scene from a first vantage point, as well as a second camera configured to capture the scene from a second vantage point that is different from the first vantage point. In some examples, the cameras may be integrated with or considered to be part of system 100, while, in other examples, the cameras may be separate from, but communicatively coupled to, system 100.

The calibration parameters determined at operation 202 may include any of the intrinsic or extrinsic calibration parameters described herein. As such, the calibration parameters may represent information indicating how each camera is intrinsically configured to capture image data, as well as information indicative of the respective vantage points (e.g., physical locations, orientations, etc.) of each camera with respect to the other cameras and/or with respect to a 3D coordinate space (e.g., a world coordinate system) associated with the scene. Additional detail related to calibration parameters determined at operation 202, as well as the scenes and objects being captured and the cameras used to capture them, will be described below.

At operation 204, system 100 may obtain pose data for an object included in the scene. For example, the object may be depicted both by a first image captured by the first camera and by a second image captured by the second camera, and, in certain instances, may be an object that is recognizable to system 100 (e.g., as opposed to an object that would be novel to, or unrecognized by, system 100) and for which additional data is available to system 100 (e.g., pose data representative of how the object is capable of being posed, etc.). Such objects may be referred to herein as "known" or "recognized" objects and may include any of the objects described herein (e.g., human body objects, human face objects, pre-analyzed furniture objects or other inanimate objects, etc.) that system 100 may have special insight about (e.g., by being able to access data such as machine learning models that will be described in more detail below). As one example, based on pose data accessible to system 100 and obtained at operation 204, system 100 may gain special insight into human body objects that allow system 100 to, for instance, identify a human body within an image, identify various features (e.g., joints, body parts, etc.) of the human body regardless of the pose of the body in the image, make predictions about the pose of the body, assess confidence levels of pose estimations, and so forth. Additional detail related to pose data and how the pose data is generated and obtained at operation 204 will be described below.

At operation 206, system 100 may estimate a pose of the object in the scene. For example, the pose may be estimated in any of the ways described herein and may be based on the calibration parameters determined at operation 202, the pose data obtained at operation 204, the first and second images captured by the set of cameras, and any other suitable data as may serve a particular implementation. However, as mentioned above and as will be described in more detail below, the pose estimated at operation 206 may be estimated independently of depth data for the object. For example, in certain implementations, operation 206 may be performed independent of depth data because depth data may not be captured, detected, or otherwise used in any way. In other implementations, operation 206 may be performed without relying on depth data that may be captured for other purposes (e.g., besides volumetric modeling) or that may be used (e.g., after operation 206 is complete) in redundant or supplementary ways such as described above. Various aspects of estimating the pose of an object independent of depth data such as performed at operation 206 will be described in more detail below.

At operation 208, system 100 may generate model data of the scene. In some examples, this model data may include a volumetric representation (e.g., data representative of a volumetric model) of the object in the estimated pose that was estimated at operation 206. The volumetric representation may be initialized and/or maintained (e.g., updated, animated, etc.) based on the model data generated by system 100. Additionally, the model data may be provided (e.g., transmitted, etc.) to a device configured to render the volumetric model based on the model data and to present the model to a user in connection with any of the applications or use cases described herein. In some examples, a volumetric representation of an object may be generated, managed, provided, or otherwise processed part-by-part (e.g., rather than as an integrated whole). For instance, a volumetric representation of a human body object may be composed of a plurality of smaller volumetric representations of component parts of the human body objects such as the face or head of the body, the torso of the body, different limbs (e.g., arms and/or legs) of the body, and so forth. Additional detail related to model data and how volumetric representations are generated, provided, and rendered will be described below.

Figure 3:
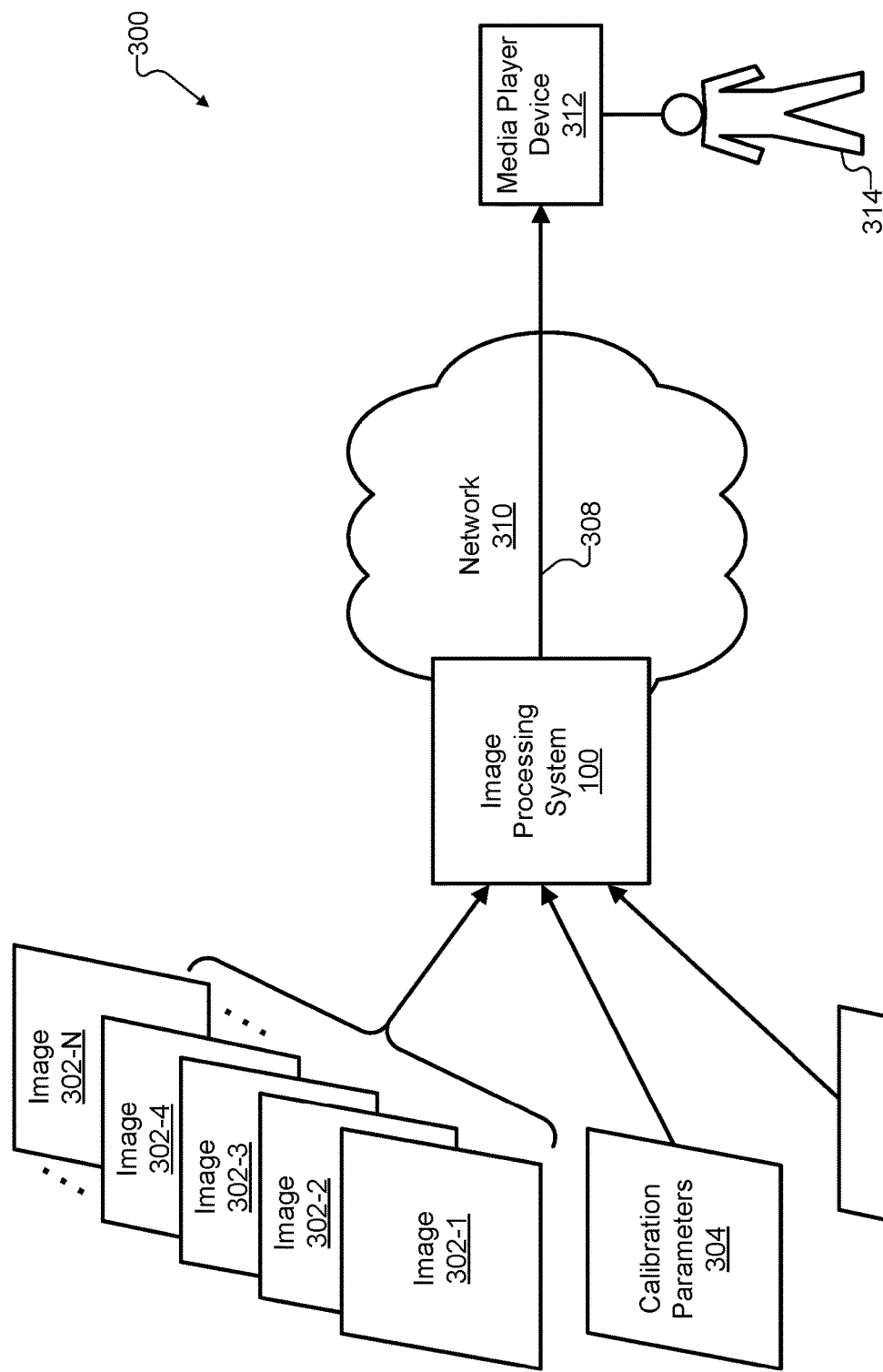
FIG. 3 shows an illustrative configuration within which the image processing system of FIG. 1 may operate to volumetrically model one or more objects independent of depth data according to embodiments described herein.

FIG. 3 shows an illustrative configuration 300 within which system 100 may operate to volumetrically model a 3D object independent of depth data in accordance with principles described herein. As shown, configuration 300 includes various types of data (depicted within parallelograms having non-right angles in FIG. 3 to differentiate from physical systems and devices depicted using rectangles) that are provided to and received or otherwise obtained by system 100. Specifically, for example, a plurality of images 302 (e.g., images 302-1 through 302-N) may be provided to system 100 by an image capture system including a set of cameras that capture the images. A set of calibration parameters 304 may be provided to system 100 by the image capture system (e.g., by a calibration system included within or otherwise associated with the image capture system) to indicate calibration parameters of the set of cameras. Pose data 306 may be provided to system 100 by a machine learning system or other such system configured to model and accumulate insights with respect to certain types of objects (e.g., recognizable objects such as human body objects that may be depicted in images 302). While the data illustrated in items 302-306 is illustrated as being provided by sources external to system 100, it will be understood that, in certain implementations, data sources for some or all of this data (e.g., an image capture system, a camera calibration system, a machine learning system, etc.) may be integrated with system 100 such that system 100 may obtain or determine this data by generating the data, rather than by receiving or accessing the data from external data sources as shown in configuration 300.

Configuration 300 further shows that system 100 may provide model data 308 by way of a network 310 to a media player device 312 associated with a user 314. For example, as will be described in more detail below, model data 308 may be generated by system 100 based on images 302, calibration parameters 304, and/or pose data 306 using methods and systems for volumetric modeling independent of depth data described herein. Each of the elements of configuration 300 will now be described in more detail with reference to FIG. 3, as well as with reference to FIGS. 4-8.

Figure 4:
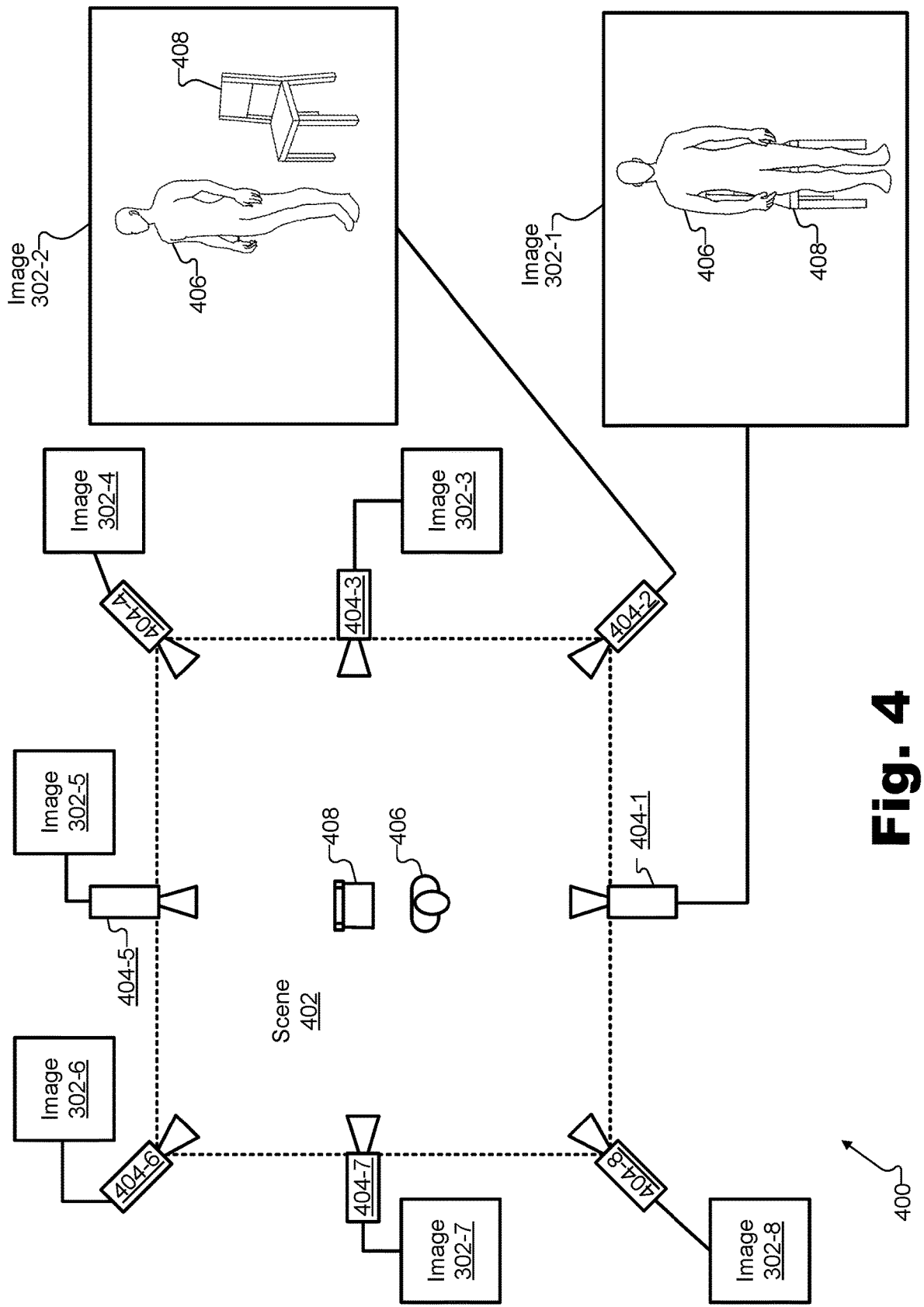
FIG. 4 shows an illustrative configuration used for capturing images of objects in a scene by a set of cameras having different vantage points of the scene according to embodiments described herein.

Images 302 may be captured and provided to system 100 by an image capture system communicatively coupled with (or, in certain implementations, integrated with) system 100 in any suitable way. For example, FIG. 4 shows an illustrative configuration 400 that may be employed for capturing images of objects in a scene. Specifically, as shown in FIG. 4, configuration 400 includes a scene 402 (e.g., a square-shaped real-world scene outlined by a dotted line in this example) around which a set of cameras 404 (e.g., cameras 404-1 through 404-8) are arranged so as to have different vantage points of scene 402. Present within scene 402, configuration 400 shows two objects: 1) a first object 406 that, in this example, is implemented as a human body object and may also referred to herein as person 406; and 2) a second object 408 that, in this example, is implemented as an inanimate furniture object and may also be referred to herein as chair 408.

Each of cameras 404 in configuration 400 may be configured to synchronously capture respective images 302 to be provided to system 100 in any suitable way (e.g., by way of an image capture system not explicitly shown in FIG. 4 that manages capture and transmission of images 302). As shown, image 302-1 may be captured by camera 404-1 to depict person 406 and chair 408 from the vantage point of camera 404-1, image 302-2 may be captured by camera 404-2 to depict person 406 and chair 408 from the vantage point of camera 404-2 (which, as shown is different from the vantage point of camera 404-1), and so forth. In FIG. 4, illustrative depictions of objects 406 and 408 are shown for images 302-1 and 302-2, while the other images 302-3 through 302-8 are only labeled with text. It will be understood that each of images 302-3 through 302-8 may likewise include depictions of objects 406 and 408 from the respective vantage points of cameras 404-3 through 404-8, though these images are not explicitly shown in FIG. 4 due to space constraints.

Respective sets of images such as images 302 may be synchronously captured by cameras 404 at various times so as to continually capture data representing objects 406 and 408 as the objects change, move about scene 402, leave scene 402 or are joined by other objects, and so forth. For example, cameras 404 may be a set of synchronized real-world video cameras or virtual video cameras configured to capture scene 402 (and whatever objects may be included therein) several times per second. Respective sets of images (e.g., including the set of images 302, which may all depict scene 402 at a particular moment in time) may be provided to system 100 by way of direct wired or wireless communication and/or by way a network (e.g., network 310) that may implement and/or employ any suitable communication technologies, devices, media, protocols, or the like as may serve a particular implementation.

While objects 406 and 408 are depicted, respectively, as a human body object and a particular furniture object (e.g., a chair object) in configuration 400, it will understood that these objects are illustrative only, and that various types of real and/or virtual objects may be included as targets for volumetric modeling in various real-world and/or virtual scenes. For instance, in addition or as an alternative to objects 406 and 408, objects representing other people, props, animals, vehicles, inanimate objects, and so forth may be present in a scene such as scene 402.

Scene 402 may be implemented as any type of real-world or virtual scene set indoors or outdoors and having any size or other characteristics as may serve a particular implementation. For instance, in one example, scene 402 may be a real-world studio setting where a single object is included within the scene for the purpose of generating and updating a volumetric model of the object. Conversely, in another example, scene 402 may be a relatively large real-world event venue such as a playing field where a sporting event is taking place or a stage where a concert or other such event is being performed. In these examples, a large number of objects (e.g., a large number of people and/or other suitable subjects) may be volumetrically modeled concurrently. In yet another example, scene 402 may be implemented by a virtual world (e.g., an imaginary world of a video game or virtual reality experience that is generated entirely using computer generated imagery, etc.) that is virtually captured and/or modeled in order to increase the efficiency of encoding, storing, distributing, and/or otherwise managing the scene.

In the example of configuration 400, cameras 404 may capture image data (e.g., color data such as red-green-blue (RGB) data, grayscale data, a combination of these, or other suitable types of image data representative of objects within scene 402). For instance, cameras 404 may be implemented as two-dimensional (2D) capture devices (e.g., video cameras, still cameras, etc.) configured to generate 2D imagery depicting objects 406, 408, and/or any other objects that may come to be present in scene 402 from the respective vantage points of cameras 404. While, as mentioned above, depth data capture may be implemented in certain implementations, it will be understood that in the illustrated example of FIG. 4, cameras 404 capture only image data and provide only image data and metadata. As such, cameras 404 in this example may not capture or provide depth data and thus may not include or be implemented by depth capture devices (e.g., time of flight depth capture devices, stereoscopic depth capture devices, etc.) configured to scan objects within scene 402 to determine spatial properties of the surfaces of the objects in 3D space.

Each of cameras 404 in configuration 400 may be calibrated to determine various intrinsic and/or extrinsic calibration parameters of the cameras and to thereby facilitate optimal functionality of system 100 and/or other systems that are to use image data captured by cameras 404, to eliminate performance and quality issues, and so forth. In certain implementations, camera calibration of cameras 404 may be performed during a designated time period and may involve dedicated objects (e.g., chessboard objects or objects with other well-defined and recognizable features) that facilitate the camera calibration. In other implementations, camera calibration of cameras 404 may be performed (or revisions and modifications to the camera calibration may be made) during normal operation of the cameras (e.g., while imagery is being captured for use in generating volumetric models) and/or with ordinary objects included within the scene (e.g., person 406 and/or chair 408).

Intrinsic calibration parameters determined as part of the camera calibration of cameras 404 may be indicative of internal characteristics of the cameras. For instance, intrinsic calibration parameters may indicate focal length, skew, distortion, image center, and so forth, for each camera 404 so as to help mitigate or correct for lens distortion and/or other unwanted artifacts of image capture. Extrinsic calibration parameters may also be determined as part of the camera calibration of cameras 404, and may be indicative of respective positions and/or orientations of cameras 404 with respect to a 3D coordinate space associated with scene 402. For instance, extrinsic calibration parameters may be associated with scene alignment for cameras 404 to ensure that each camera 404 shares a common world coordinate space and that the same features captured by different cameras are properly identified as the same features, and are aligned in the world coordinate space.

Returning to FIG. 3, calibration parameters 304 may include any of the intrinsic or extrinsic parameters that have been described. Calibration parameters 304 may be determined by system 100 or by an image capture system separate from and communicatively coupled to system 100 (e.g., an image capture system that includes cameras 404), and may be provided to and/or obtained by system 100 in any suitable way. For example, system 100 may determine calibration parameters 304 by calculating the calibration parameters itself or by obtaining the calibration parameters from another source such as the image capture system.

Pose data 306 may be obtained by system 100 from any suitable source for any suitable object type (e.g., including a human body object type for person 406, a chair object type for chair 408, other object types for other objects in scene 402, etc.). To this end, system 100 may identify an object within at least one of images 302 (e.g., image 302-1, image 302-2, etc.) as being an instance of an object type for which a machine learning model is available to system 100. As mentioned above, an object of such an object type may be referred to as a recognized object or a known object. As one example, the recognized object identified as being included in the scene may be a human body object such as human body object 406.

Pose data 306 may be associated with (e.g., may implement, may be implemented by, may be included within, etc.) the machine learning model that is available to system 100 for the recognized object, and, as such, may represent how the recognized object (as well as other objects of that object type) are capable of being posed. For instance, if the recognized object is human body object 406, pose data 306 may be obtained for this object 406 by accessing a machine learning model of how the human body object is capable of being posed (e.g., a data representation indicative of how various joints are capable of bending, etc.) in response to the identifying of object 406 as the instance of the human body object type.

Figure 5:
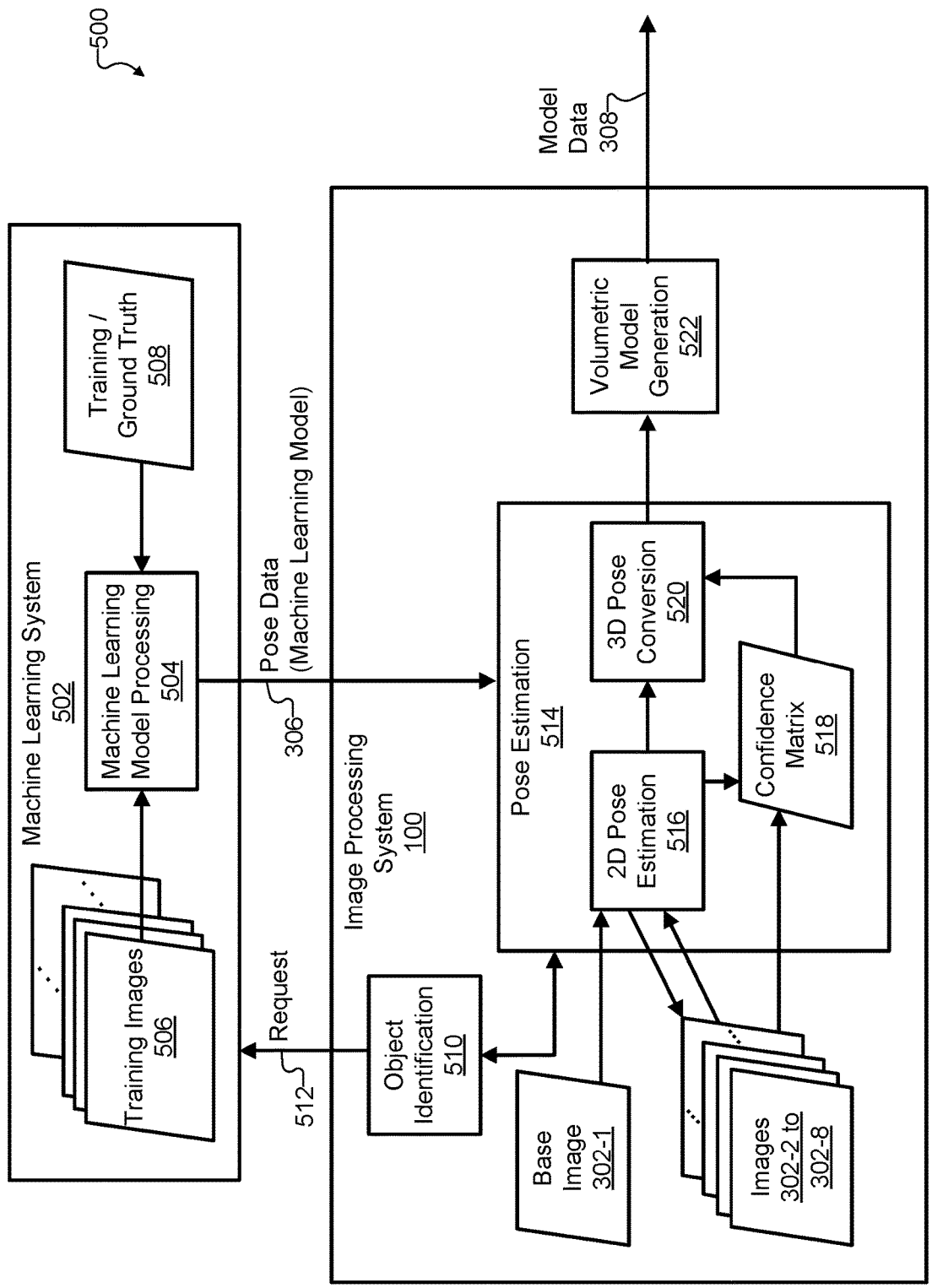
FIG. 5 shows an illustrative block diagram depicting data and operations performed by the image processing system of FIG. 1 and a machine learning system to model an object in an estimated pose independent of depth data according to embodiments described herein.

To illustrate one way this type of data exchange may be performed, FIG. 5 shows an illustrative block diagram 500 depicting data and operations performed by system 100 and a machine learning system 502 as system 100 models an object in an estimated pose independent of depth data. In block diagram 500, physical systems and operations are illustrated by rectangles while data (e.g., input data, intermediate data, output data, etc.) processed or output by the systems and operations is illustrated by parallelograms with non-right angles or by arrows. Specifically, as shown, machine learning system 502 may perform an operation 504 for machine learning model processing, and, in doing so, may use data from a set of training images 506 and input data 508 representative of training or ground truth input associated with each training image 506. A machine learning model implementing pose data 306 may be generated and maintained (e.g., updated, corrected, enhanced, and/or otherwise managed) as a product of operation 504.

In block diagram 500, system 100 is shown to include an operation 510 for object identification and that generates a request 512. Operation 510 may involve any automated object recognition technique that may be used to analyze images 302 and to identify, within one or more of the images, a recognized object for which pose data is available. Upon identifying such an object, operation 510 may cause request 512 to be made to machine learning system 502 such that pose data 306 (i.e., the machine learning model generated and managed by operation 504 in this example) may be provided by machine learning system 502 in response to request 512. For example, as shown, pose data 306 may be provided for use by an operation 514 associated with pose estimation of the recognized object identified at operation 510.

Operation 514 may estimate the pose of the object using an operation 516 for 2D pose estimation, a confidence matrix 518, and an operation 520 for 3D pose conversion. An estimated pose determined by operation 514 may then be provided for use by an operation 522 for generating a volumetric model that includes the model data 308 provided as an output of system 100 as described above in relation to FIG. 3. Each of the operations and data instances shown in FIG. 5 will now be described in more detail.

Operation 504 is shown to be performed by machine learning system 502, which may be integrated with or separate from and communicatively coupled to system 100. Operation 504 is configured to facilitate feature extraction of an object whose pose is to be estimated by system 100 (e.g., as part of operations such as those included in pose estimation operation 514). For example, operation 504 may generate and maintain a machine learning model of a recognized object (e.g., a human body object, etc.) that provides system 100 with specific information (e.g., special insight) regarding the recognized object so as to allow system 100 to accurately locate features of the recognized object for pose estimation processes. By providing pose data 306 associated with such a machine learning model, operation 504 may help system 100 eliminate visual errors, thereby resulting in an improved pose estimation. In certain examples, system 100 may identify features of a recognized object without relying on a machine leaning model such as implemented by pose data 306. However, when operation 504 is performed so as to make a robust machine learning model available, the model may serve as a data filter or screen to help ensure that pose estimation and volumetric modeling are performed accurately and effectively.

Machine learning system 502 may perform operation 504 to generate and manage the machine learning model associated with pose data 306 based on training images 506 and input data 508 (e.g., training/ground truth input data) that may involve human input such as from expert annotators or other sources (e.g., crowdsourcing, etc.). Machine learning system 502 may incorporate one or more machine learning networks configured to perform various types of machine learning tasks. For instance, one machine learning network incorporated into machine learning system 502 may be a semantic segmentation network configured to semantically segment different components of an object such as different body parts (e.g., right hand, left hand, head, torso, etc.) for a human body object such as human body object 406. Another machine learning network incorporated into machine learning system 502 may be a joint detection network configured to identify various joints of an object regardless of how the object is posed (since certain types of objects such as human body objects may be posed in a large number of different ways). Operation 504 may represent any operation or operations performed by either of these illustrative machine learning networks or any other suitable operations performed in the generation or processing of a machine learning model.

The training associated with operation 504 may make it possible for pose data 306 of a machine learning model to be produced (e.g., generated, provided, updated, etc.), and may be performed using a combination of human input (e.g., by expert annotators, by open source contributors, etc.) and novel automation processes to make efficient use of the human contributors' time and ability in the creation of ground truth interpretations. Specifically, rather than relying on a training expert to locate each and every joint or segmentation line for each and every training image, machine learning system 502 may use pose data 306 itself (even as the machine learning model is being generated and improved) to locate joints and segments for each image. An annotation tool (e.g., a computer interface configured to facilitate the training process) that presents these estimations to a human expert may be employed to make it easy for the expert to either approve the estimations (if the expert determines that the system has estimated correctly and accurately), or to correct the estimations (if the expert determines that the system has erred). In this way, one or more human experts may team with machine learning system 502 in the machine learning training process to efficiently manage machine learning models. In some examples, machine learning training processes may also use previously trained datasets or non-expert human trainers (e.g., crowdsourced human resources) or other training techniques as may serve a particular implementation.

Machine learning system 502 may provide pose data 306 associated with a machine learning model to system 100 to assist system 100 in estimating a pose of a recognized object identified in one or more images 302 received from one or more cameras 404. For example, after identifying a recognized object (operation 510), requesting pose data for the object (request 512), and receiving relevant pose data in response (pose data 306), system 100 may perform operation 514 based on images 302 and pose data 306 to accurately and efficiently locate features of the recognized object and estimate a pose for the recognized object at a particular moment in time with which images 302 are associated.

As the pose of a recognized object is estimated at operation 514, it will be understood that the recognized object may be depicted more clearly in certain images 302 than in others. For example, in certain images 302, the recognized object may not be depicted at all (e.g., due to the geometry of the position of the recognized object and other objects in the scene with respect to the vantage point of the cameras 404 capturing these images). In other images 302, the recognized object may be depicted, but a portion of the object may be occluded from view from the all of the vantage points of the cameras 404 such that none of images 302 depict the portion of the object.

Figure 6:
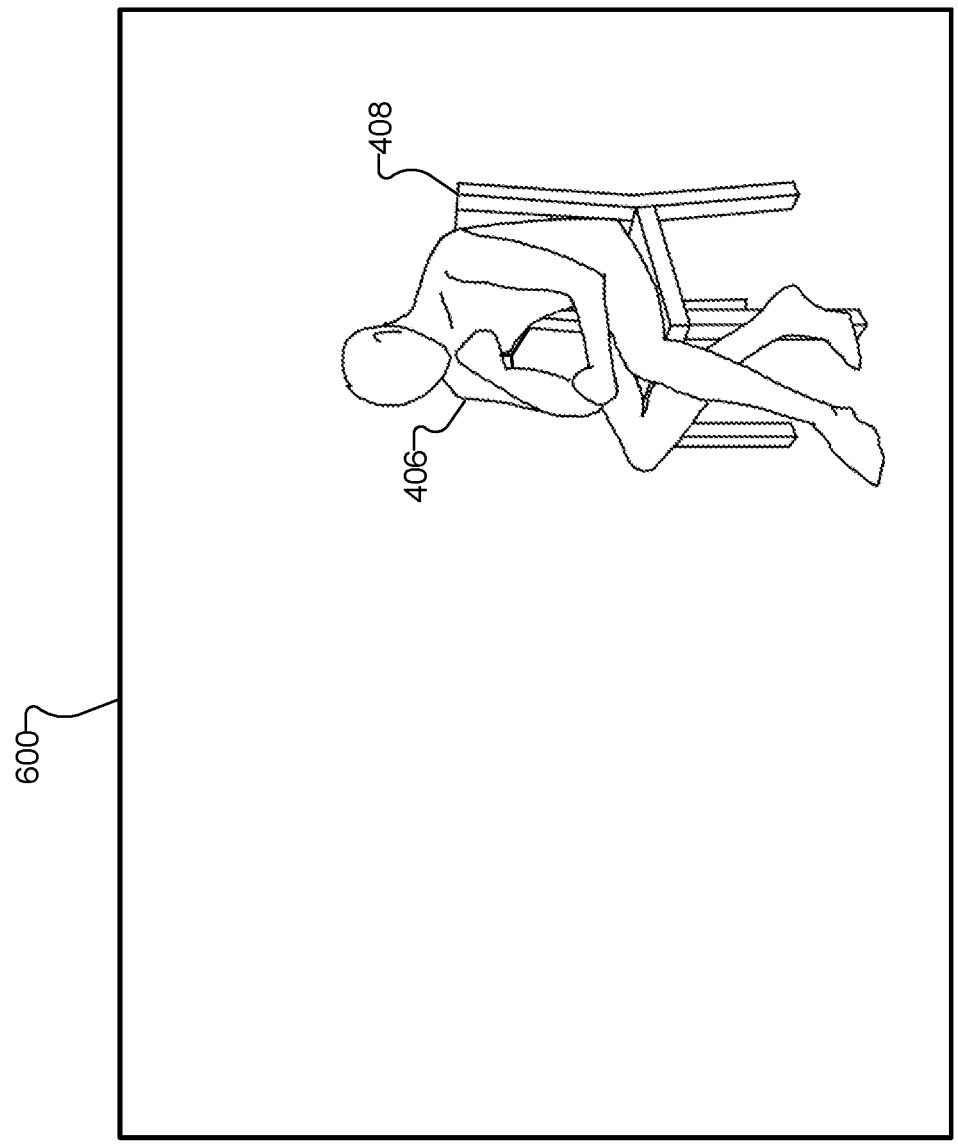
FIG. 6 shows an illustrative image depicting objects that have portions occluded from view from various vantage points according to embodiments described herein.

To illustrate, FIG. 6 shows an illustrative image 600 depicting a moment in time when objects 406 and 408 (i.e., person 406 and chair 408) have portions occluded from view from some or all of the vantage points of cameras 404. For example, in contrast to the moment in time depicted by images 302-1 and 302-2 in FIG. 4, where person 406 is standing somewhat apart from chair 408 such that all portions of person 406 and chair 408 may be captured from at least one of the vantage points of cameras 404, the different moment in time depicted by image 600 in FIG. 6 represents a time when certain portions of person 406 and/or chair 408 are occluded from all vantage points. At this moment in time (e.g., as person 406 is sitting in chair 408), certain portions of person 406 and/or chair 408 may not be able to be detected by capture devices that rely on line of sight. As one particular example, at the time represented by image 600, portions of the back of person 406 may be occluded by the seat back of chair 408 just as portions of the seat back may be occluded by person 406. Other portions of both person 406 and chair 408 may also occlude one another from some or all of the camera vantage points at this moment in time.

If a representation of scene 402 were to be created that could only be viewed from the vantage points of the set of cameras 404, these occlusions may not have any import. However, if the aim of system 100 is to generate a volumetric model representation of scene 402 and the objects included therein (e.g., a volumetric model that is to be capable of being viewed from arbitrary vantage points that extended reality users experiencing scene 402 may select), these occlusions may be detrimental to the volumetric model being generated because they may result in "holes" or unfinished portions of the models. For example, if an extended reality (e.g., virtual reality) presentation of scene 402 is provided to a user who is free to virtually move around and experience scene 402 from arbitrary vantage points, the user could conceivably find vantage points allowing a view of the portions of objects 406 and 408 that are completely occluded from the camera vantage points. Since person 406 is leaning forward in chair 408, for instance, one example of a potentially problematic vantage point would be standing behind the chair and looking down between the back of person 406 and the seat back of chair 408. If the volumetric models of objects 406 and 408 were to be generated exclusively based on image and/or depth data captured by cameras 404 or other capture devices at the same vantage points, the user would see portions of objects 406 and/or chair 408 that would not be complete and may distract from the immersiveness and quality of the virtual reality experience.

System 100 may address these potential issues by not relying exclusively on captured image (or depth) data, but, rather, by recognizing in a more cognitive manner that object 406 is a human body object that should conform with a machine learning model of human body objects, as well as that object 408 is a chair object that should conform with a machine learning model of chair objects. This recognition may allow system 100 to statistically extrapolate data and achieve logical consistency for volumetric models even when there are portions of the objects that cannot be explicitly captured. For instance, based on the insight gained from machine learning models about certain object types, system 100 may fill in holes in volumetric models of the object that might otherwise be left were the models to rely exclusively on available captured data available.

Along with filling in portions of volumetric models for which captured data is not available (e.g., due to occlusion, due to the object being too close to the camera vantage point to be fully captured, or for other reasons), system 100 may also be configured to extrapolate certain aspects of the pose of objects based on machine learning models that provide insight about pose capabilities of the object type. For example, even if certain joints are occluded from the vantage points of the cameras such that how those joints are posed at a certain moment in time is not explicitly detectable, system 100 may extrapolate how the joints are likely to be posed based on the pose data indicative of how the joints, and the object as a whole, are capable of being posed (e.g., indicating that knees and elbows of human body objects such as person 406 bend in one direction but not the other, indicating that chairs such as chair 408 are rigid and do not bend, etc.).

More particularly, system 100 may estimate the pose of an object at operation 514 by estimating an aspect of the pose associated with the portion of the object that is occluded from view. Then, the generating of model data 508 (e.g., the generating of the volumetric representation of the object) may include extrapolating, based on the estimated aspect of the pose, model data representative of the portion of the object that is occluded from view. In a sense, once a pose of an object is approximated at operation 514, machine learning may be employed "in reverse" to approximate a full figure view of the object in the image based on its estimated pose (e.g., by layering textures of the object on top of a skeleton of the object in the estimated pose). This approach may increase overall efficiency and/or decrease overall latency of the volumetric modeling since camera/point multiplication may be a faster and more efficient operation than model creation and retracing.

Returning to FIG. 5, pose estimation operation 514 may be configured to "estimate" a pose for an object depicted in one or more images 302 in the sense that the pose ultimately output by operation 514 may be understood to be the highest confidence pose of the object based on data from multiple images, rather than the exact pose that may be detected based on any single image. As a result, an estimated pose that accounts for nuances of the actual pose as viewed from several different vantage points may be understood to be at least somewhat distinct from the actual pose of the object. This is advantageous because the estimated pose, even if not guaranteed to reflect the reality of what is happening in the scene, serves as a functional, "agreed-upon" pose that can be relied on to generate a fully-formed volumetric model (e.g., without holes or missing portions as described above) that is most likely to be accurate from various viewpoints, and not just from a single viewpoint.

To this end, the estimating of the pose at operation 514 may include estimating the pose based on one image (e.g. a base image such as image 302-1 in one example) and verifying or correcting that pose based on other images (e.g., any of images 302-2 to 302-8 that also captured the object). More specifically, operation 514 may be performed by detecting, based on base image 302-1 and pose data 306, a first estimated pose of the object from the first vantage point of camera 404-1, and then may predict, based on the first estimated pose and calibration parameters 506 (which may indicate, for example, the precise spatial relationship between the first vantage point and the other vantage points of the other cameras), a predicted pose of the object from another vantage point such as the second vantage point of camera 404-2. Based on image 302-2 and this predicted pose, operation 514 may further involve detecting a second estimated pose of the object from the second vantage point and may merge the first and second estimated poses to achieve the functional or "agreed-upon" pose such as described above.

In some examples, the estimating of the pose at operation 514 may be performed in accordance with confidence metrics used to indicate the degree to which the actual pose of the object is likely to be reliably estimated based on each image 302 (e.g., from imagery captured from each different vantage point from which each image 302 is captured). Specifically, for instance, the estimating of the pose of the object at operation 514 may involve detecting (e.g., based on the plurality of additional images 302-3 through 302-8 captured synchronously with images 302-1 and 302-2 by cameras 404-3 through 404-8, respectively) a plurality of additional estimated poses of the object from additional respective vantage points of cameras 404-3 through 404-8. Based on some or all of these images 302-1 through 302-8, system 100 may generate confidence matrix 518 to indicate a respective confidence metric for an accuracy of each of the respective estimated poses associated with each of images 302. The merging of the first and second estimated poses may then further include merging, based on the confidence matrix, one or more of the plurality of additional estimated poses together with the first and second estimated poses.

For example, if a particular image 302 has a relatively clear view of the object, the confidence metric associated with that image 302 may be relatively high and the estimated pose associated with that image 302 may be weighted relatively heavily as the overall estimated pose is determined. In contrast, if another image 302 has a relatively poor view of the object (e.g., from an undesirable angle, from extremely close-up or far away from the object, from a viewpoint that is partially or fully occluded, etc.), the confidence metric associated with that image 302 may be relatively low and the estimated pose associated with that image 302 may be ignored completely or at least given less weight as the overall estimated pose is determined.

Suboperations and arrows depicted within pose estimation operation 514 in FIG. 5 illustrate an example of how the pose estimation may be performed in one particular example. Specifically, as shown, operation 516 may input a base image (e.g., image 302-1 in this example) and may estimate a pose of an object based on that 2D image (as well as based on pose data 306). For example, based on features identified based on pose data 306, operation 516 may identify a basic pose (e.g., selected from a set of potential basic poses in a library of basic poses maintained in certain implementations). Additionally, based on the vantage point associated with base image 302-1 and the position and/or orientation of the object, operation 516 may include determining a confidence metric that is added to (e.g., stored within, etc.) confidence matrix 518. After the first 2D pose is estimated, operation 516 may proceed to predict and estimate additional 2D poses of the object in a similar way (e.g., based on each of the other images 302, based on pose data 306, and based on transformation geometries derivable from calibration parameters 304 between the cameras 404 at their respective vantage points).

Figure 7:
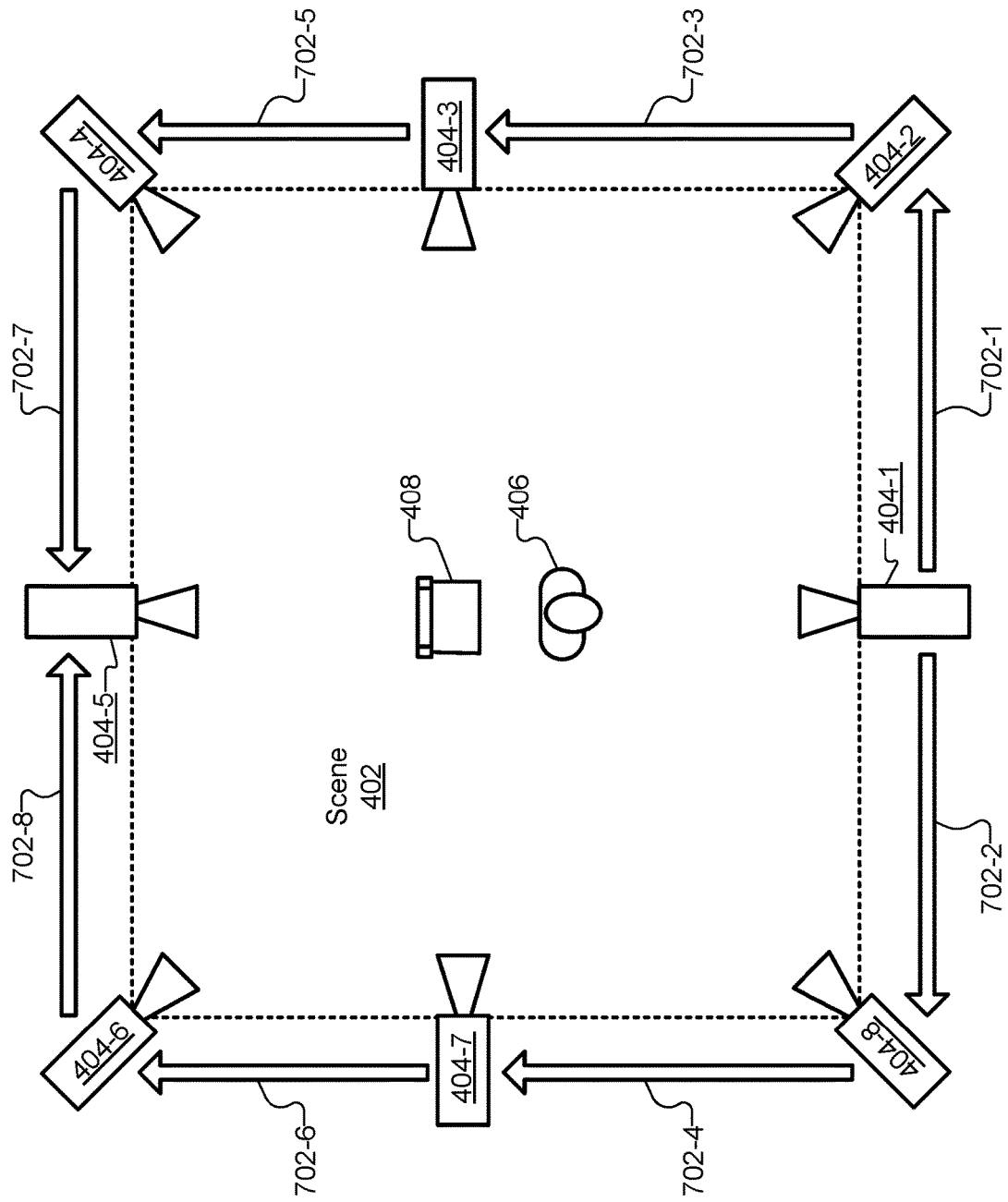
FIG. 7 shows illustrative aspects of how a pose of an object may be estimated independent of depth data by using image data from different vantage points according to embodiments described herein.

To illustrate, FIG. 7 shows illustrative aspects of how the pose of objects 406 and/or 408 may be estimated independent of depth data by using image data captured from different vantage points of different cameras 404. Specifically, similarly as described above in relation to FIG. 4, FIG. 7 shows scene 402 including objects 406 and 408, and shows cameras 404-1 through 404-8 at different vantage points around the scene. In the example where camera 404-1 is treated as the base camera (e.g., making image 302-1 the base image, as illustrated in FIG. 6), FIG. 7 shows various transformation geometries 702 (transformation geometries 702-1 through 702-8) between camera 404-1 and other cameras. By determining and accounting for these transformation geometries, system 100 may predict how a 2D pose estimation from the perspective of camera 404-1 is expected to look from the different perspectives of the other cameras, and may correct or adjust the pose estimation (e.g., in accordance with the confidence metrics for each camera) to attempt to determine an overall pose estimation that is accurate and agreed upon to a high degree by analyses from each of the different vantage points.

The predictions and transformations represented by FIG. 7 may be performed in any manner and using any pattern as may serve a particular implementation. For instance, as shown in FIG. 7, a transformation geometry 702-1 from camera 404-1 to camera 404-2 may be determined based on calibration parameters 304 (e.g., extrinsic calibration parameters) for cameras 404-1 and 404-2. Based on transformation geometry 702-1, transformation geometry 702-3 may then be determined from camera 404-2 to camera 404-3 based on calibration parameters 304 for cameras 404-2 and 404-3. In parallel with this, a transformation geometry 702-2 from camera 404-1 to camera 404-8 may also be determined based on calibration parameters 304 for cameras 404-1 and 404-8. Each of transformation geometries 702-4 through 702-8 may likewise be determined based on the respective calibration parameters 304 of each pair of cameras 404 associated with the respective transforms.

Returning to FIG. 5, operation 516 may determine respective 2D pose estimations for each image 302 in this way by transforming, predicting, detecting, correcting, and/or otherwise analyzing the pose from each of the vantage points of cameras 404 and in accordance with confidence metrics managed in confidence matrix 518. Additionally, as shown by an arrow going back from operation 516 to the images 302, operation 516 may involve filling in holes and/or otherwise reprojecting missing information related to the object as depicted in images 302.

For each 2D pose estimation determined in this way, a respective confidence value may be added to confidence matrix 518 such that, when 2D pose estimations and confidence values are determined with respect to each of images 302-1 through 302-8, system 100 may weight all of the potential 2D pose estimations in accordance with the confidence values to determine an overall functional or "agreed-upon" pose estimation that is provided as input to operation 520. In some examples, as mentioned above, certain 2D pose estimations may be dropped or ignored all together as a result of a low confidence metric. Other 2D pose estimations may all be accounted for in accordance with their confidence values using any type of weight averaging technique as may serve a particular implementation.

At operation 520, the overall estimated pose determined at operation 516 using confidence matrix 518 may be converted into a 3D pose. For instance, once it is determined that person 406 is in, for example, the neutral standing pose shown in images 302-1 and 302-2 (see FIG. 4) or the sitting pose shown in image 600, operation 520 may convert that 2D standing or sitting pose into a 3D pose by determining points in 3D space where each of the features (e.g., joints and body parts of person 304 in this example) are with respect to one another or with respect to a 3D coordinate space associated with scene 402. More particularly, based on the estimated pose of the object determined at operation 516, system 100 may identify 3D locations of a plurality of features of the object within a 3D coordinate space associated with the scene.

Determining 3D locations of features of an object in a particular pose may be performed based on pose data 306, machine learning models such as those described herein, pose libraries of different basic poses for certain objects types, and/or any other data. However, along with determining a 3D pose of an object, system 100 may also be configured to determine a location of the object in the scene (e.g., with respect to the 3D coordinate space of the scene or another suitable world coordinate system).

Determining the location of the posed object may be performed in any suitable way. For example, system 100 may estimate the position of an object in a scene independently of any depth data for the object by estimating the position based on images of the scene from different vantage points and calibration parameters associated with the cameras at those vantage points. The estimating of the position of the object in the scene may involve, for instance, identifying a feature set (e.g., a grouping a different features) of the object that is depicted in two or more of the images, determining an apparent size discrepancy of the feature set as depicted in the two or more images, and estimating the position of the object based on the apparent size discrepancy and based on positions (e.g., the vantage points) of the respective cameras that captured the two or more images (e.g, as indicated by the calibration parameters obtained for those cameras).

Figure 8:
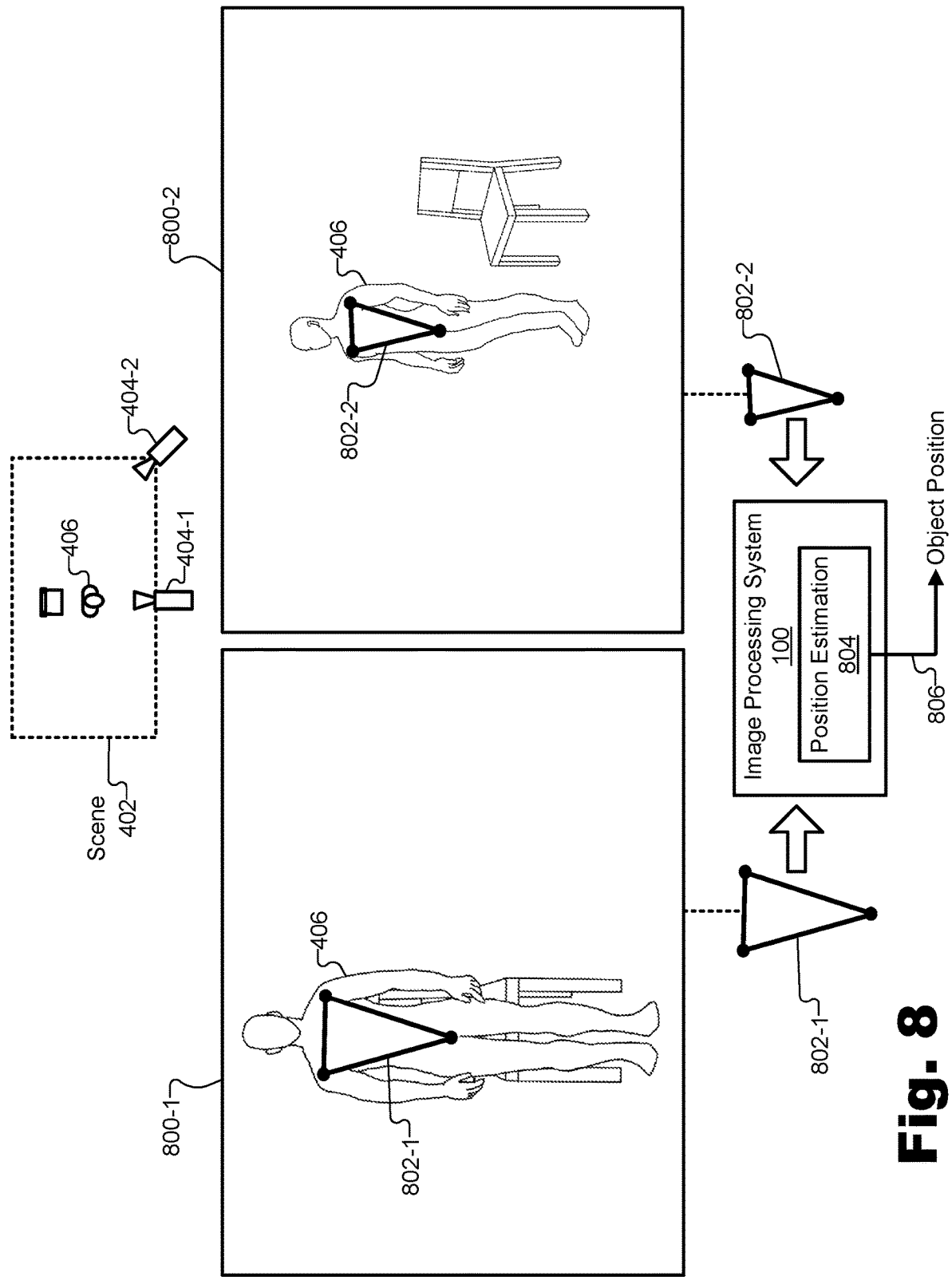
FIG. 8 shows illustrative aspects of how a position of an object may be estimated independent of depth data by using image data from different vantage points according to embodiments described herein.

To illustrate, FIG. 8 shows example aspects of how a position of object 406 (i.e., person 406 described and illustrated in other images above) may be estimated independent of depth data by using image data from different vantage points in accordance with principles described herein. At the top of FIG. 8, a thumbnail sketch of scene 402 is included to show, from a top view, the basic geometry of object 406 with respect to scene 402 and cameras 404-1 and 404-2 at their respective vantage points. This geometry is similar to the geometry shown in images 302 described above (see FIG. 4) except that object 406 is moved so as to be significantly closer to the vantage point of camera 404-1 than to the vantage point of camera 404-2 for reasons that will be made apparent. Two respective images 800 (i.e., images 800-1 and 800-2) are also shown in FIG. 8 that depict person 406 as captured, respectively, by camera 404-1 (image 800-1) and by camera 404-2 (image 800-2). As shown, due to the relatively close proximity of person 406 to the vantage point of camera 404-1, person 406 is depicted to be relatively large in image 800-1, while, due to the relatively far distance between person 406 and the vantage point of camera 404-2, person 406 is depicted as being relatively small in image 800-2.

Even though each of images 800 is captured from a different respective vantage point, certain features of person 406 may be identifiable in both images 800. For example, most features associated with the front side of person 406, including the front of each shoulder and a pelvic area where the legs meet the torso of person 406, happen to be visible from both vantage points. Accordingly, a feature set 802 that includes a plurality of these features may be identified by system 100 in each of images 800 (e.g., feature set 802-1 in image 800-1 and feature set 802-2 in image 800-2). Feature sets 802 may be implemented as any suitable set of features that are detectable within two or more images. For example, a feature set may be the start and end of an arm segment (e.g., an upper arm segment or a lower arm segment) of an object like person 406, a length of one of the legs of an object like chair 408, or a polygon formed based on links between three or more common features (e.g., a triangle as illustrated by feature sets 802; a square, pentagon, or other polygon formed based on links between four or more features; etc.).

Based on the relative scale of the feature sets 802 identified in the different images 800 (e.g., the size discrepancy between feature set 802-1 as depicted in image 800-1 and feature set 802-2 as depicted in image 800-2), and based on the known intrinsic and extrinsic calibration parameters of each camera 404 (e.g., indicating the respective locations and orientations of the cameras as well as their intrinsic imaging characteristics), system 100 may determine where within a scene a particular object is located. To illustrate, feature sets 802-1 and 802-2 are shown below respective images 800 at the same scale at which the feature sets are depicted in images 800. As is apparent, there is a notable size discrepancy between feature sets 802, feature set 802-1 being significantly larger than feature set 802-2. Information indicative of these relative sizes (and/or of the size discrepancy itself) is shown by arrows to be input to a position estimation operation 804 that is performed by system 100. For example, operation 804 may be performed as part of operation 520, operation 522, or may be a separate operation performed by system 100 in association with the other operations illustrated in block diagram 500. Based on an analysis of the size discrepancy between feature sets 802 at operation 804, system 100 may determine and output an object position 806 that may be included within the model data generated and provided by system 100.

It is noted that position estimation operation 804 may be configured to account for the different orientations of respective feature sets 802 as object position 806 is determined. For example, because the torso of person 406 is at a different angle in image 800-2 than the straight-on view of image 800-1, system 100 may account for this in the determination of object position 806.

Returning to FIG. 5, the estimated 3D pose of the object determined at operation 520 (as well as, in certain examples, an estimated position 806 of the object determined at operation 804) may be used at operation 522 to generate a volumetric model of the object in the estimated pose. More particularly, based on the identified 3D locations of the features as determined at operation 520, system 100 may generate model data 308 that corresponds to the volumetric representation of the object in the estimated pose. In certain examples, the generating of model data 308 may further include generating and/or incorporating position data representative of an object position of the object in the scene (e.g., representative of object position 806 in the example of object 406 illustrated in FIG. 8, or representative of another similarly-calculated object position in other examples involving other objects). System 100 may also associate the position data generated at operation 522 with the volumetric representation of the object as model data 308 is output and provided to downstream systems or devices.

To generate the volumetric model at operation 522, system 100 may use several images captured synchronously from several different vantage points (e.g., images 302 for one point in time, other similar sets of images for other points in time, etc.) for each frame of the model. As time proceeds forward, system 100 may use additional sets of synchronous images to update the model as objects move and change within the scene (e.g., as person 406 changes pose, moves to a different location, turns to a different orientation, moves chair 408, etc.). Volumetric models of objects 406, 408, and/or other objects included within a scene such as scene 402, once generated and while being updated and otherwise managed by system 100, may be provided for use in any application as may serve a particular implementation.

Returning to FIG. 3, for example, volumetric model data 308 generated and continuously updated at operation 522 by system 100 may be provided (e.g., by way of network 310) to media player device 312 associated with user 314.

Network 310 may include any network elements and/or characteristics as may serve a particular implementation. For example, network 310 may include elements of a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). Additionally or alternatively, network 310 may include elements of various interconnected networks that are outside of any provider network and outside the control of any provider of such a provider network. Elements of the Internet, a wide area network, a content delivery network, and/or any other suitable network or networks are examples of other elements that may be included within network 310. Any of these provider or non-provider networks or network elements may provide data delivery between system 100 and media player device 312.

Media player device 312 may be implemented as any type of computing device used by user 314 to experience a volumetric model generated by system 100 and represented in model data 308. For example, if a volumetric model is to be presented as part of an extended reality experience (e.g., a virtual reality experience, an augmented reality experience, etc.) in which user 314 is engaged, media player device 312 may be implemented as an extended reality device (e.g., a head-mounted device) configured to present the extended reality experience. In the same or other examples, media player device 312 may be implemented as a general-purpose computing device (e.g., a mobile device such as a smartphone or tablet device, a personal computing device such as a laptop computer, etc.). Such a device may present an extended reality experience to user 314 that features volumetric models of objects included in captured scenes (e.g., objects 406 and/or 408 of scene 402). In other examples, such media player device 312 may present volumetric or other models in other suitable types of applications such as communications applications (e.g., a 3D video phone), engineering applications (e.g., a 3D computer-aided design application), or any other type of application that makes use of 2D or 3D object models.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 9:
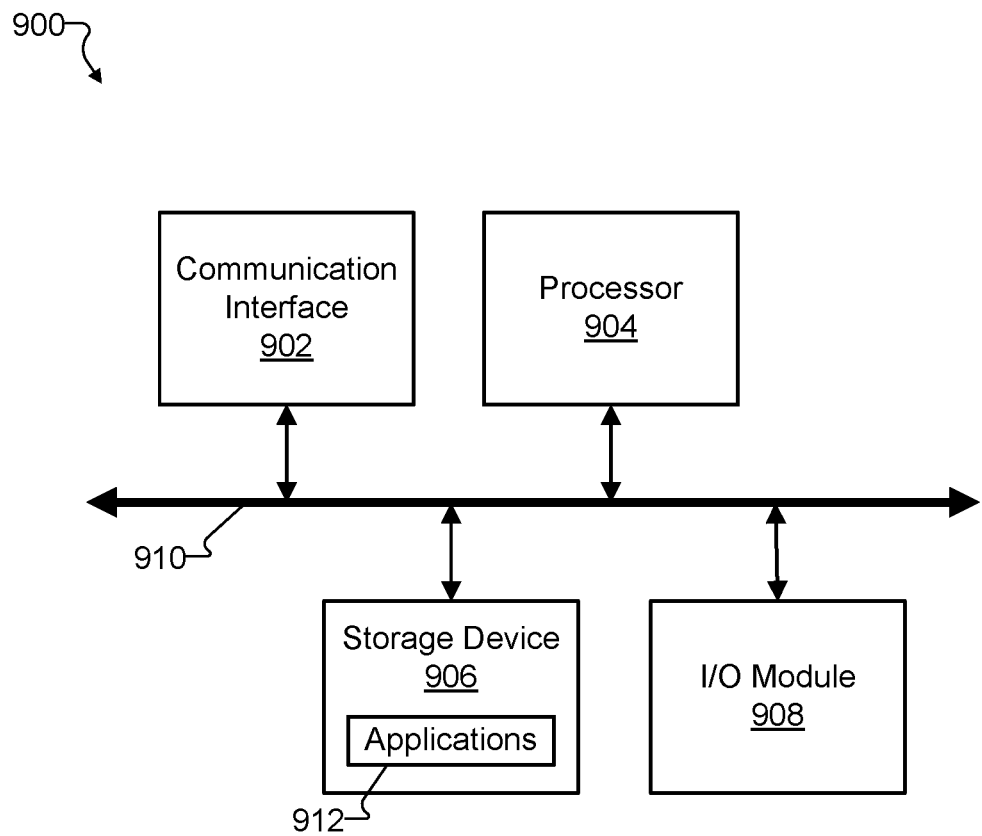
FIG. 9 shows an illustrative computing device according to embodiments described herein.

FIG. 9 shows an illustrative computing device 900 that may be specifically configured to perform one or more of the processes described herein. For example, computing system 900 may include or implement (or partially implement) an image processing system such as system 100 or any component included therein or system associated therewith. For example, computing system 900 may include or implement an image capture system such as described in relation to FIG. 4, a machine learning system such as machine learning system 502 described in relation to FIG. 5, control or communications elements of certain cameras 404, a media player device such as media player device 312, or any other computing systems or devices described herein.

As shown in FIG. 9, computing system 900 may include a communication interface 902, a processor 904, a storage device 906, and an input/output (I/O) module 908 communicatively connected via a communication infrastructure 910. While an illustrative computing system 900 is shown in FIG. 9, the components illustrated in FIG. 9 are not intended to be limiting. Additional or alternative components may be used in other embodiments. Components of computing system 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 900. For example, one or more applications 912 residing within storage device 906 may be configured to direct processor 904 to perform one or more processes or functions associated with processor 104 of system 100. Likewise, memory 102 of system 100 may be implemented by or within storage device 906.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   determining, by an image processing system, that an object partially depicted in an image is an instance of an object type for which a machine learning model is available to the image processing system;
   obtaining, by the image processing system in response to the determining that the object is the instance of the object type, pose data generated based on the machine learning model to provide insight about pose capabilities of the object type by representing how objects of the object type are capable of being posed; and
   generating, by the image processing system, a full volumetric representation of the object in a pose that is estimated, independently of depth data for the object, based on the image and based on the insight about the pose capabilities of the object type provided by the pose data.

2. The method of claim 1, wherein:
   the image is captured by a first camera from a first vantage point;
   the object is also depicted in an additional image that is captured by a second camera from a second vantage point different from the first vantage point;
   the method further comprises estimating, by the image processing system, a functional pose for the object based on the pose data and further based on both the image and the additional image; and
   the pose in which the full volumetric representation of the object is generated is the functional pose.

3. The method of claim 2, wherein the estimating of the functional pose of the object comprises:
   detecting, based on the image and the pose data, a first estimated pose of the object from the first vantage point of the first camera;
   predicting, based on the first estimated pose, a predicted pose of the object from the second vantage point of the second camera;
   detecting, based on the additional image and the predicted pose, a second estimated pose of the object from the second vantage point of the second camera; and
   merging the first and second estimated poses to form the functional pose.

4. The method of claim 2, wherein the estimating of the functional pose of the object comprises:
   detecting, based on the image and the pose data, a first estimated pose of the object from the first vantage point of the first camera;
   detecting, based on the additional image and the pose data, a second estimated pose of the object from the second vantage point of the second camera;
   generating a confidence matrix indicating a first confidence metric for an accuracy of the first estimated pose and a second confidence metric for an accuracy of the second estimated pose; and
   merging, based on the confidence matrix, the first and second estimated poses to form the functional pose.

5. The method of claim 1, further comprising:
   determining, by the image processing system, calibration parameters for a camera that captured the image depicting the object; and
   estimating, by the image processing system, a functional pose for the object based on the image and the pose data and further based on the calibration parameters;
   wherein the pose in which the full volumetric representation of the object is generated is the functional pose.

6. The method of claim 5, wherein the calibration parameters for the camera include intrinsic parameters indicative of internal characteristics of the camera.

7. The method of claim 5, further comprising determining, by the image processing system, additional calibration parameters for an additional camera that captures an additional image depicting the object;
   wherein:
      the calibration parameters for the camera include extrinsic parameters indicative of a position and orientation of the camera with respect to a 3D coordinate space associated with a scene at which the object is located, and
      the additional calibration parameters for the additional camera include extrinsic parameters indicative of a position and orientation of the additional camera with respect to the 3D coordinate space.

8. The method of claim 1, further comprising estimating, by the image processing system and based on the image depicting the object, a position of the object with respect to a 3D coordinate space associated with a scene at which the object is located, the position estimated independently of depth data for the object;
   wherein the generating of the full volumetric representation of the object includes generating position data representative of the position of the object and associating the position data with the full volumetric representation of the object.

9. The method of claim 8, wherein the estimating of the position of the object comprises:
   identifying a feature of the object that is depicted in the image; and
   estimating the position of the object based on an apparent size discrepancy of the feature as depicted in the image and as depicted in an additional image captured from a different vantage point than the image.

10. The method of claim 1, wherein:
    the object is partially depicted in the image by a portion of the object being occluded from view so as to not be depicted in the image;
    the pose estimated for the object includes an aspect of the pose associated with the portion of the object that is occluded from view; and the generating of the full volumetric representation includes extrapolating, based on the aspect of the pose, model data representative of the portion of the object that is occluded from view.

11. The method of claim 1, wherein the object depicted in the image is a human body object and the pose data generated based on the machine learning model provides insight about pose capabilities of human bodies by representing how human bodies are capable of being posed.

12. A system comprising:
a memory storing instructions; and
a processor communicatively coupled to the memory and configured to execute the instructions to:
   determine that an object partially depicted in an image is an instance of an object type for which a machine learning model is available to the system;
   obtain, in response to the determining that the object is the instance of the object type, pose data generated based on the machine learning model to provide insight about pose capabilities of the object type by representing how objects of the object type are capable of being posed; and
   generate a full volumetric representation of the object in a pose that is estimated, independently of depth data for the object, based on the image and based on the insight about the pose capabilities of the object type provided by the pose data.

13. The system of claim 12, wherein:
the image is captured by a first camera from a first vantage point;
the object is also depicted in an additional image that is captured by a second camera from a second vantage point different from the first vantage point;
the processor is further configured to execute the instructions to estimate a functional pose for the object based on the pose data and further based on both the image and the additional image; and
the pose in which the full volumetric representation of the object is generated is the functional pose.

14. The system of claim 13, wherein the estimating of the functional pose of the object comprises:
detecting, based on the image and the pose data, a first estimated pose of the object from the first vantage point of the first camera;
predicting, based on the first estimated pose, a predicted pose of the object from the second vantage point of the second camera;
detecting, based on the additional image and the predicted pose, a second estimated pose of the object from the second vantage point of the second camera; and
merging the first and second estimated poses to form the functional pose.

15. The system of claim 13, wherein the estimating of the functional pose of the object comprises:
detecting, based on the image and the pose data, a first estimated pose of the object from the first vantage point of the first camera;
detecting, based on the additional image and the pose data, a second estimated pose of the object from the second vantage point of the second camera;
generating a confidence matrix indicating a first confidence metric for an accuracy of the first estimated pose and a second confidence metric for an accuracy of the second estimated pose; and
merging, based on the confidence matrix, the first and second estimated poses to form the functional pose.

16. The system of claim 12, wherein:
the processor is further configured to execute the instructions to:
   determine calibration parameters for a camera that captured the image depicting the object, and
   estimate a functional pose for the object based on the image and the pose data and further based on the calibration parameters; and
the pose in which the full volumetric representation of the object is generated is the functional pose.

17. The system of claim 12, wherein:
the processor is further configured to execute the instructions to estimate, based on the image depicting the object, a position of the object with respect to a 3D coordinate space associated with a scene at which the object is located, the position estimated independently of depth data for the object; and
the generating of the full volumetric representation of the object includes generating position data representative of the position of the object and associating the position data with the full volumetric representation of the object.

18. The system of claim 12, wherein:
the object is partially depicted in the image by a portion of the object being occluded from view so as to not be depicted in the image;
the pose estimated for the object includes an aspect of the pose associated with the portion of the object that is occluded from view; and
the generating of the full volumetric representation includes extrapolating, based on the aspect of the pose, model data representative of the portion of the object that is occluded from view.

19. A non-transitory computer-readable medium storing instructions that, when executed, direct a processor of a computing device to:
   determine that an object partially depicted in an image is an instance of an object type for which a machine learning model is available to the computing device;
   obtain, in response to the determining that the object is the instance of the object type, pose data generated based on the machine learning model to provide insight about pose capabilities of the object type by representing how objects of the object type are capable of being posed; and
   generate a full volumetric representation of the object in a pose that is estimated, independently of depth data for the object, based on the image and based on the insight about the pose capabilities of the object type provided by the pose data.

20. The non-transitory computer-readable medium of claim 19, wherein:
the image is captured by a first camera from a first vantage point;
the object is also depicted in an additional image that is captured by a second camera from a second vantage point different from the first vantage point;
the instructions further direct the processor to estimate a functional pose for the object based on the pose data and further based on both the image and the additional image; and
the pose in which the full volumetric representation of the object is generated is the functional pose.

* * * * *